Nov. 28, 1939. F. RADELET ET AL 2,181,819
GUN BATTERY OR MOUNTING, MORE PARTICULARLY FOR ANTIAIRCRAFT DEFENSE
Filed March 16, 1936 7 Sheets-Sheet 1
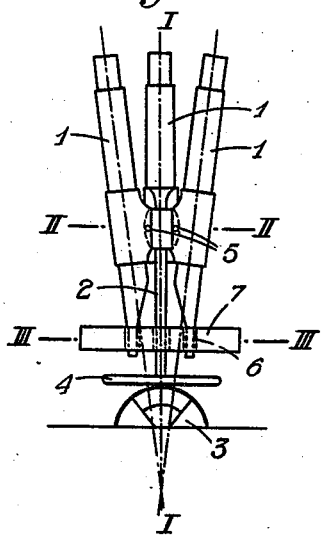
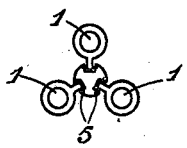
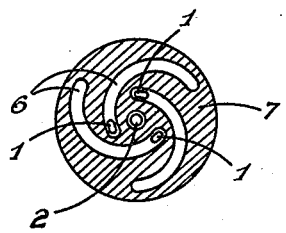
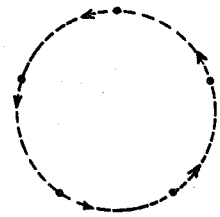
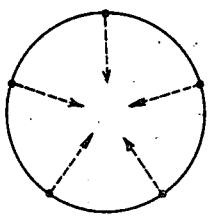
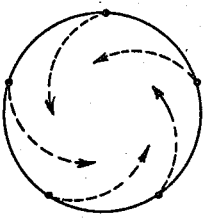
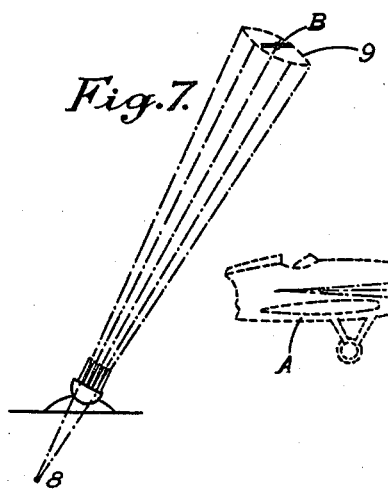
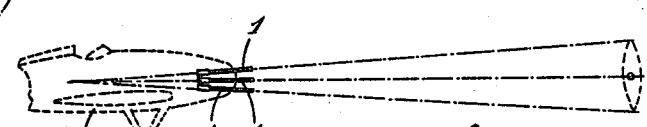

Nov. 28, 1939.  F. RADELET ET AL  2,181,819
GUN BATTERY OR MOUNTING, MORE PARTICULARLY FOR ANTIAIRCRAFT DEFENSE
Filed March 16, 1936  7 Sheets-Sheet 2
Fig. 9.
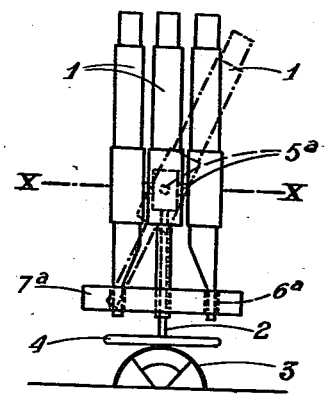
Fig. 10.
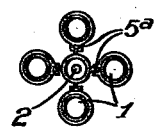
Fig. 11.
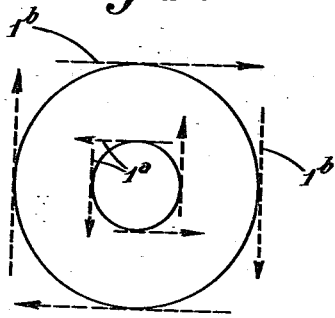
Fig. 12.  Fig. 13.
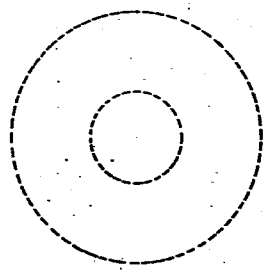 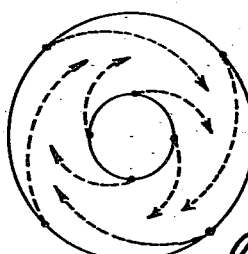

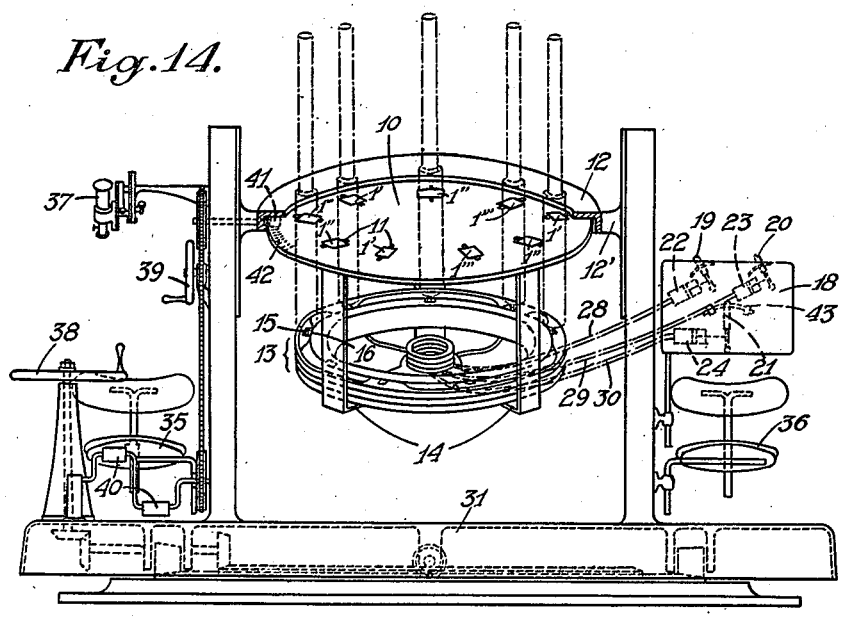

Nov. 28, 1939. F. RADELET ET AL 2,181,819
GUN BATTERY OR MOUNTING, MORE PARTICULARLY FOR ANTIAIRCRAFT DEFENSE
Filed March 16, 1936 7 Sheets-Sheet 4
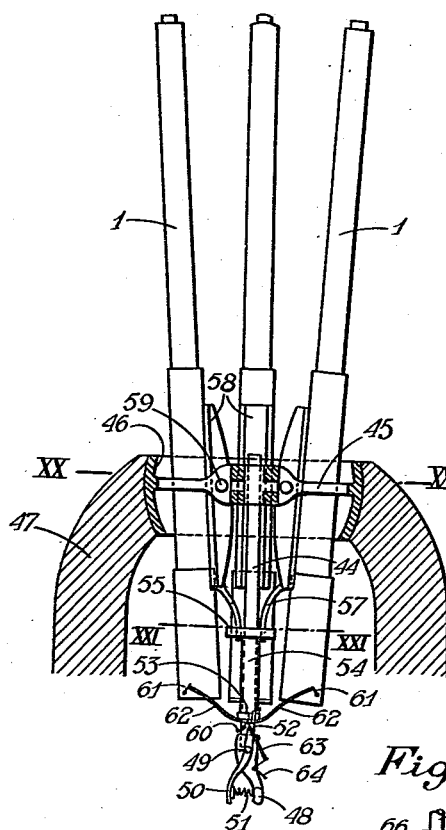
Fig. 19.
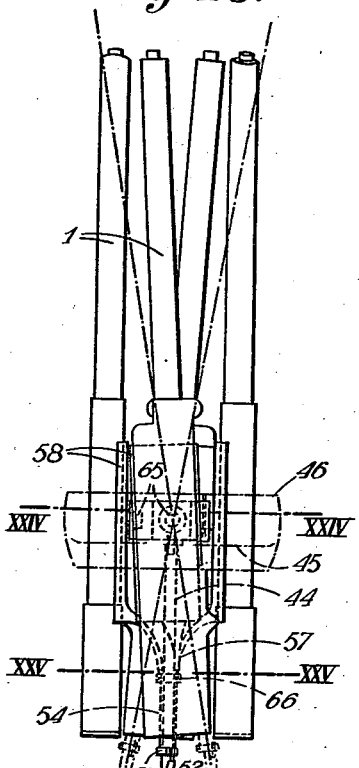
Fig. 23.
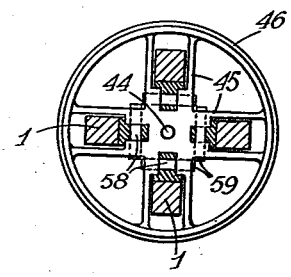
Fig. 20.
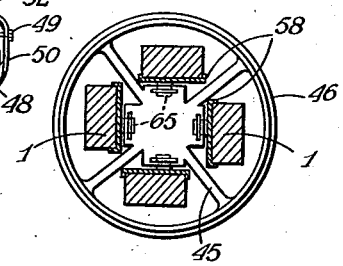
Fig. 24.
Fig. 22.
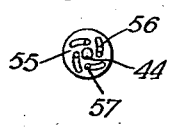
Fig. 21.
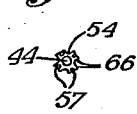
Fig. 25.
Inventors
F. Radelet and
M. Schul
By E. F. Wenderoth
Atty

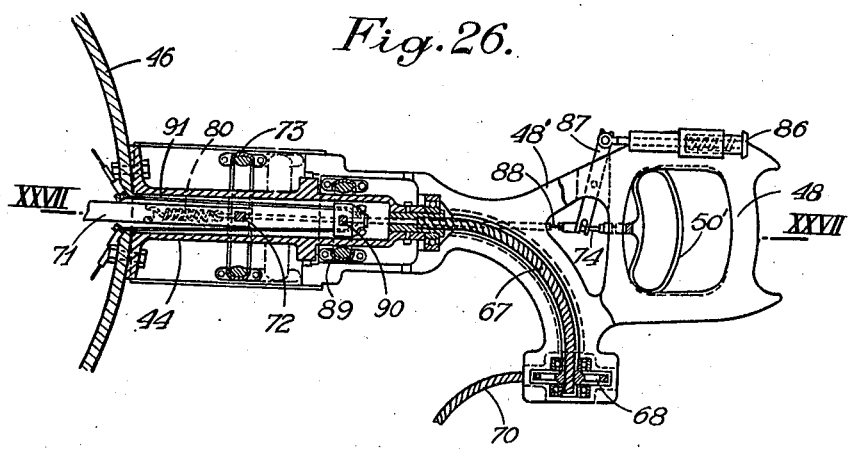
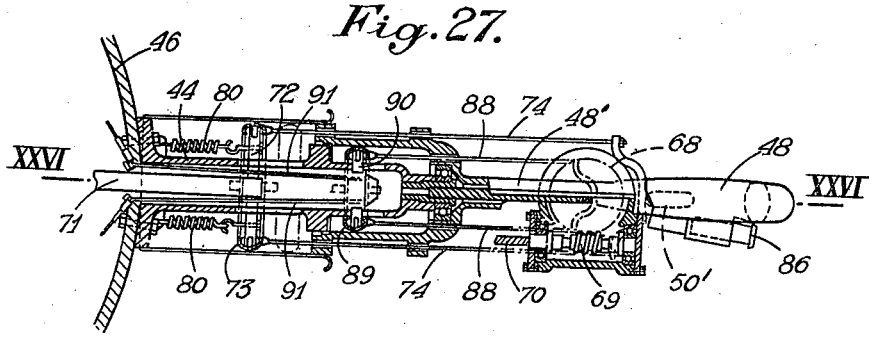
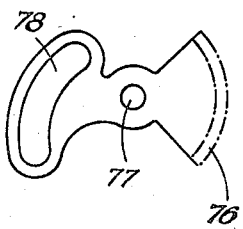
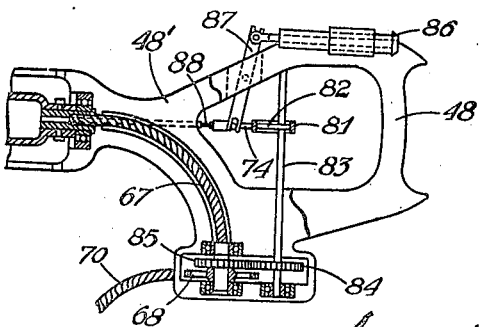

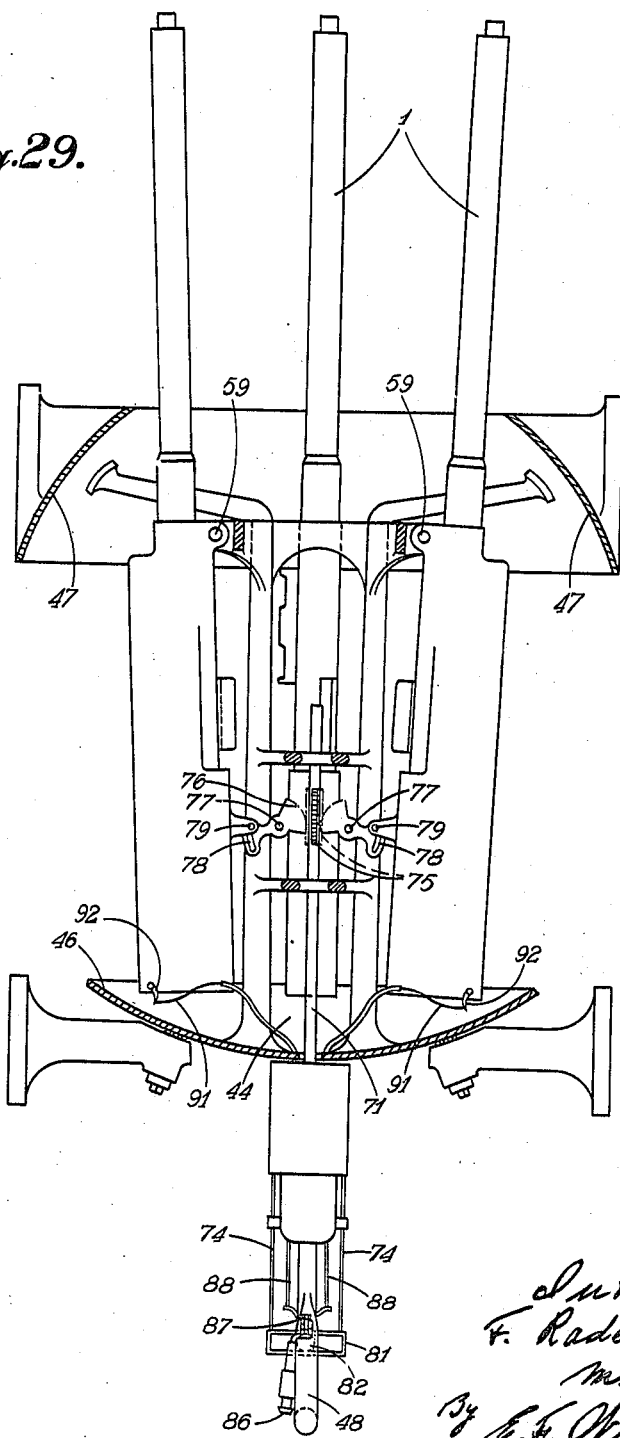

Patented Nov. 28, 1939

2,181,819

UNITED STATES PATENT OFFICE 2,181,819

GUN BATTERY OR MOUNTING, MORE PARTICULARLY FOR ANTIAIRCRAFT DEFENSE

Fernand Radelet and Max Schul, Brussels, Belgium

Application March 16, 1936, Serial No. 69,208
In France March 16, 1935

2 Claims. (Cl. 89—37)

This invention relates to gun batteries or mountings and it has for its object to provide a battery of machine guns or like automatically operating barrels which is so mounted, arranged and operated that its fire can reach automatically and with practical certainty, within the firing range of the barrels used, the target aimed at, for example an airplane or other rapidly moving object, owing to a suitable and/or predetermined distribution of the bullets or other projectiles in the field covered by the battery.

To this end, according to our invention, instead of scattering the barrels of the battery in order to converge the fire from different points towards the target, the barrels are grouped as a bundle adapted to be pointed towards the future position of the target, and adapted to be opened and closed in order to cover a varying field, and/or adapted to be rotated about its axis in order to encircle the field covered. The future position of the target towards which the operator trains the opened bundle is automatically inscribed within the field under fire and the target is practically unable to escape the projectiles which are distributed by the operator either at will or according to a predetermined firing graph, by varying the opening of the bundle and/or by rotating same.

A battery or mounting in accordance with our invention therefore comprises at least one bundle of barrels mounted on a rotatable support or carriage, said barrels being angularly movable with respect to the geometrical axis of the bundle and/or being rotatable together about said axis. Preferably the barrels are both angularly movable and rotatable, either singly or in groups, so that when the two movements are combined they can be made to fire their bullets along spirals or other figures and any desired or predetermined distribution of the bullets can be attained.

In order to open and close the bundle, the barrels may be mounted to rock radially with respect to the axis of the bundle, or they may be made to rock tangentially to a circle concentric to said axis, the latter arrangement having the advantage of taking up less room when the battery is open, and to be more suitable when two or more concentric bundles are used in order to increase the bullet density. We may also mount the barrels on ball or Cardan supports so that they may be rocked in all directions. In one embodiment of our invention the barrels, instead of being arranged in circles around the battery axis, are arranged in rows or in staggered or like formation and they are each mounted in ball or universal bearings, so that they can be rocked singly, or in rows, or all together.

The battery or mounting comprises means for controlling the opening and closing of the bundle of barrels, and/or its rotation, said means being adapted to be operated mechanically, electrically or by fluid pressure. In one embodiment of our invention the means controlling the angular movements of the barrels in order to open or close the bundle, are combined with means for angularly offsetting relatively to one another, either singly or in groups, the barrels of the battery in order to vary the distribution of the bullets in the field covered. The invention also enables the controls of the angular movements of the barrels, the controls of the rotation of the bundle and the firing controls to be combined, preferably as a single easily operable handle, so that the operator may control these various functions with one hand only. Alternatively, in order to reduce the strain on the operator, the necessary power for rotating the battery and/or for opening and closing the bundle may be supplied by a servo-motor or by a pedal control, in conjunction with the hand control.

These and other features of our invention will be more fully described hereinafter, with reference to the accompanying drawings in which several embodiments of the invention are illustrated.

Fig. 1 is a diagrammatical elevation showing a battery or bundle adapted to open radially.

Fig. 2 is a cross-section on line II—II of Fig. 1 and

Fig. 3 is a cross-section on line III—III of Fig. 1.

Figs. 4, 5 and 6 are explanatory graphs.

Fig. 7 diagrammatically illustrates a land battery adapted to operate in accordance with our invention.

Fig. 8 likewise illustrates the firing from a flying battery.

Fig. 9 is an elevation showing a battery adapted to open tangentially.

Fig. 10 is a cross-section on line X—X of Fig. 9.

Fig. 11 diagrammatically illustrates the arrangement of a battery with two concentric bundles.

Figs. 12 and 13 are explanatory graphs illustrating the firing from said batteries respectively.

Fig. 14 shows in elevation, partly in vertical section, a battery in which the barrels may be angularly offset relatively to each other.

Fig. 15 is a top view of the ring for controlling the angular offsetting of the barrels.

Figs. 16, 17 and 18 are sectional views of this ring, on lines XVI—XVI, XVII—XVII and XVIII—XVIII of Fig. 15.

Fig. 19 shows partly in elevation, partly in axial section, a battery with a single manually controlled handle.

Figs. 20 and 21 are cross-sectional views on lines XX—XX and XXI—XXI of Fig. 19 respectively.

Fig. 22 shows the controlling handle in front view.

Fig. 23 illustrates in elevation another battery with a single handle.

Figs. 24 and 25 are cross-sectional views taken on lines XXIV—XXIV and XXV—XXV respectively of Fig. 23.

Fig. 26 is a side view, partly in section on line XXVI—XXVI of Fig. 27, of a controlling handle with servo-motor, and Fig. 27 is a horizontal section on line XXVII—XXVII of Fig. 26.

Fig. 28 is a side view, partly in section, showing another form of controlling handle.

Fig. 29 is a plan view, on a smaller scale, of the modified arrangement according to Fig. 28, applied to a battery of four machine guns, the top gun being removed for the sake of clearness.

Fig. 30 is a detail view showing on a larger scale a sector for controlling the angular motion of the guns.

Figure 31:
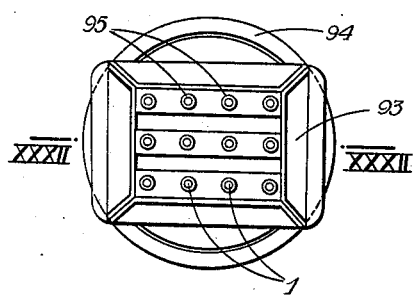

Fig. 31 is a diagrammatic plan view, showing a battery of barrels arranged in parallel rows.

Figure 32:
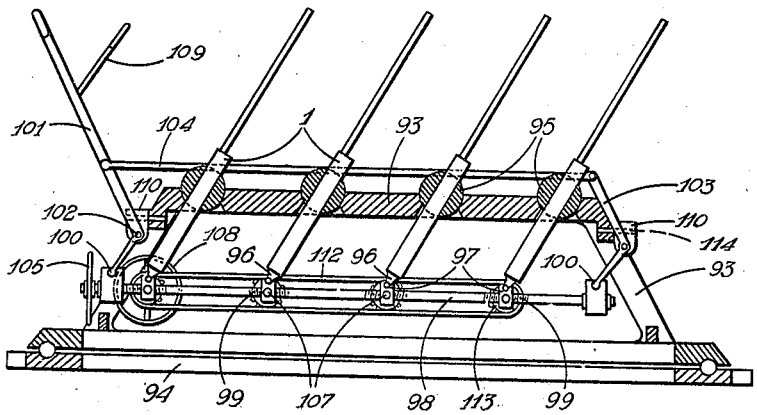

Fig. 32 is a sectional elevation, on a larger scale, on line XXXII—XXXII of Fig. 31.

Figure 33:
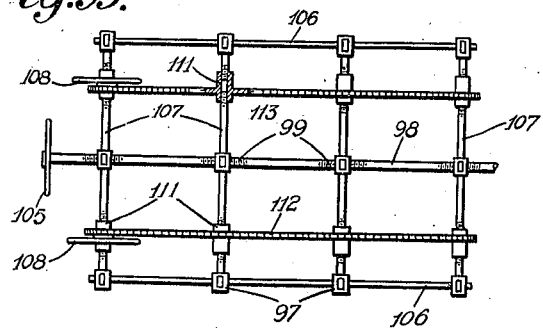

Fig. 33 shows the controlling connections in plan view and

Figure 34:
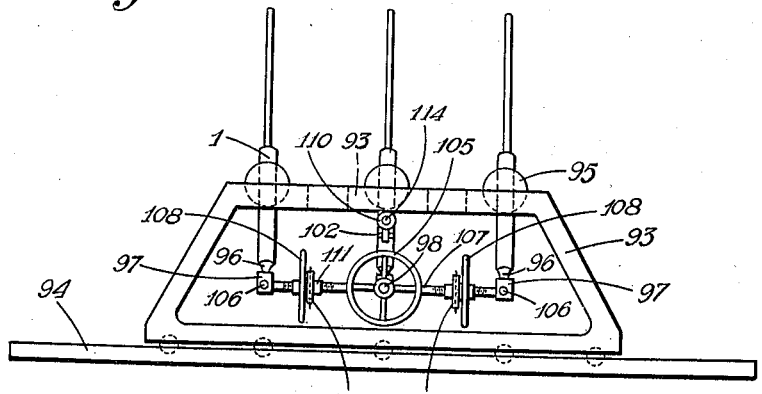

Fig. 34 is an end view of the battery shown in Fig. 32.

In Fig. 1 we have illustrated by way of example a battery of three machine guns 1 arranged at 120° to each other on a common support or cradle comprising a standard 2 mounted on a spherical support 3. By tilting the standard on the support 3, the operator can easily point the battery towards the target, for instance with the help of a sight provided on the cradle; for night sighting we can use a searchlight on the cradle, having its axis parallel to that of the battery so that a target spotted by the searchlight will be caught automatically in the fire from the battery.

A handwheel 4 is provided whereby the battery and its cradle may be rotated about the axis I—I. Each barrel 1 moreover is pivoted on the standard 2 at an intermediate point 5 of its length and the ends of the barrels are engaged in helical slots 6 formed in a disc 7 rotatably mounted on the standard 2, so that by suitably rotating the disc, the bundle of barrels may be opened or closed at will.

The battery being pointed towards the future position of the target, its fire will circumscribe a field which embraces all sighting errors and must enclose the target. By rotating the handwheel 4 and the disc 7 in the same direction, the barrels may be rotated about the axis of the battery so as to encircle this field with bullets (Fig. 4); or, by holding the wheel 4 stationary and rotating the disc 7, the fire may be moved radially from the periphery towards the centre (Fig. 5) or conversely; or again, by rotating the wheel 4 and the disc 7 in opposite directions, or differentially, we are able to move the fire along spirals which cover practically the whole field from the periphery towards the centre (Fig. 6) or conversely.

We have considered in Figs. 4 to 6 the case of a battery with five barrels, but this number may obviously be varied. We also have shown a bundle of barrels shaped as part of a cone (Fig. 7) the apex 8 of which is under the battery while its base 9 is situated in the plane in which the target moves, this being the most advantageous arrangement, but the invention is not limited thereto.

In Fig. 8, the bundle of barrels 1 is mounted on a flying machine A in substantially the same manner as above described in connection with a land battery.

In the example illustrated in Figs. 1 and 2, the pivots 5 on which the barrels 1 rock when the battery is opened or closed, are on the chords of a circle concentric to the axis of the battery, so that the angular movement of the battery is effected radially with respect to said axis. It may be more advantageous, in some cases, more particularly in order to reduce the space occupied by the battery in the open or spread position, to move the barrels tangentially to a circle concentric to the battery axis, the pivots then being arranged on radii or parallel to radii of such circle.

This form of the invention is illustrated in Figs. 9 and 10, in which like reference numerals denote the same parts as in Figs. 1 and 2, number 5a denoting the radially arranged pivots on which the barrels 1 are mounted to rock tangentially with respect to the standard 2 which extends axially of the battery. The slots 6a in the disc 7a are no longer helical but are merely of elongated shape so as to engage, with some play, the lower ends of the barrels.

It is possible to combine the radial and the tangential angular movements. This can be done, for example by mounting the barrels on ball bearings or on universal bearings so that each may be moved along a spiral, if desired without rotating the entire battery.

The bullet density may also be increased by arranging the barrels in two or more coaxial bundles whereby, for instance, it is possible to obtain converging fire or crossed fire by opening say the inner bundle while closing the outer bundle. Fig. 11 diagrammatically shows the concentric arrangement of two bundles or groups of barrels, the barrels being represented by arrows. In this figure, the barrels 1a of the inner bundle and the barrels 1b of the outer bundle are mounted each to pivot in a plane tangential to a circle concentric with the battery axis. The heads of the arrows point in the direction in which the barrels are pivoted, the barrels 1a being shown to pivot in opposite direction to the barrels 1b.

Fig. 12 diagrammatically shows the double circle enclosing a field with the bullets from a battery having two coaxial bundles turning about its axis, without simultaneous angular movement of the barrels, i. e. without variation of the bullet divergence. If, while the battery is rotated, the barrels are moved angularly so as to open the inner bundle and close the outer bundle, we obtain a spiral fire in which the diverging spirals fill the spaces between the converging outer spirals (Fig. 13), thus very efficiently covering the field. The reverse operation is also possible.

Although in a battery with two or more bundles the barrels may be mounted for radial angular movement, it is preferable to mount them for tangential angular movement in order to reduce the space taken up thereby. Then, the reaction on the carriage which is produced by firing an elevated barrel may be utilized to control the rotation of the carriage or cradle carrying the barrels, and if desired the angular movement of the barrels, in order to render automatic the operation of the battery.

In Figs. 14 to 18 we have illustrated a battery or mounting which is arranged so as to permit of concentrating the fire in predetermined zones of the field embraced by the bundle of barrels, by varying through relative angular offsetting of the barrels, the initial angle of some of the barrels, or groups of barrels, with respect to the battery axis. A simple method of initially offsetting the barrels consists in dividing into as many parts as there are barrels or groups of barrels to be offset, the member which controls the angular movement of the barrels for opening and closing the bundles, so that these parts of the control member be angularly movable with respect to each other for the initial adjustment of the barrels, and that they also be movable all together, without any relative movement, in order to open or close the bundle. The various movements for offsetting the individual barrels and for opening or closing the bundle, are conveniently controlled from a distance and by means adapted to operate automatically, as much as possible.

Referring to Fig. 14, the battery comprises a bundle of nine machine guns or like automatic barrels 1′, 1″ and 1‴, of which only a few are shown for the sake of clearness, the others being merely indicated by their reference numbers in their respective positions on the cradle 10, in the shape of a circular plate, whereby all the barrels are carried. The barrels are pivotally mounted on journals 11 and adapted to be moved angularly in planes situated tangentially with respect to the central axis of the battery, in order to open or close the bundle. Moreover the bundle as a whole is adapted to rotate about said axis, which coincides with the axis of the cradle 10 rotatably mounted in an annular support 12. This support in turn is rotatable on trunnions 12′ supported on a suitable carriage 31.

The angular movement of the barrels is controlled by means of a ring-shaped member 13 supported under the cradle 10, in coaxial relation thereto, by means of brackets 14 in which the member 13 is so mounted that it can be moved angularly with respect to the cradle, within certain limits, while always partaking in the rotation of the cradle. In the ring 13 are provided notches 16 which are engaged by fingers 15 on the barrels 1, so that any angular movement of the ring relatively to the cradle will cause an angular displacement of the barrels.

In order to produce an initial angular offsetting of the barrels, the barrels in the example considered comprise three groups of three barrels each, one group comprising three barrels 1′, the second group three barrels 1″ and the third group three barrels 1‴. The controlling ring 13 likewise is divided into three parts, in the form of coaxial rings 13′, 13″, 13‴ provided with sets of notches 16′, 16″, 16‴ respectively, each of said sets of notches being engaged by one of the groups of barrels 1′, 1″, 1‴. The rings 13′ and 13″ are carried by the ring 13‴ which is made integral with the ring-shaped member 13, and they may be moved angularly with respect to each other and with respect to the ring 13‴ in order mutually to offset the group of barrels. It will be understood that an angular movement of one of the rings relatively to the others will vary the initial angular position of the corresponding group of barrels, and that by moving the rings 13′, 13″ through different angles relatively to the ring 13‴, the three groups of barrels 1′, 1″ and 1‴ will be angularly offset, as desired, the adjustment depending on the relative positions given to the rings 13′, 13″, 13‴ and thus being controllable at will. Suitable portions of the rings 13′, 13″ are cut away at 17 as shown in Fig. 15, in order to enable the fingers 15 of each group to reach down to the notches 16 of the corresponding ring (Figs. 16 and 17).

On the control board 18 adjacent to the cradle 10 are three handles 19, 20, 21 under the control of the same operator. The handles 19 and 20 respectively control the initial angular adjustment of the barrels 1′ and 1″ through the rings 13′, 13″ while the handle 21 controls the opening and closing of the whole bundle through the angular movement of ring 13 (i. e. of rings 13′, 13″, 13‴ as a whole). The transmission of the controlling impulses may be effected in any suitable manner. In the example illustrated it is effected hydraulically through an incompressible fluid, by means of pistons 22, 23, 24 connected to the control handles, pistons 25, 26, 27 connected to the rings 13′, 13″, 13‴ and flexible pipes 28, 29, 30 coupling said pistons in pairs (Figs. 14, 15, 18). As the ring 13 must be able to turn with the cradle 10 relatively to the frame or carriage 31 supporting the control board 18, a direct connection would not be convenient on account of the danger of the pipes getting twisted. The ends of the pipes 28, 29, 30 therefore respectively open into the fixed inner walls of three annular receptacles 32, 33, 34 which are mounted to rotate with the rings 13′, 13″, 13‴ respectively, and are connected by pipes 28′, 29′, 30′, with the respective pistons 25, 26, 27 (Figs. 15 and 18). The piston 25 for actuating ring 13′ is mounted on ring 13″, while the piston 26 for actuating 13″ is mounted on ring 13‴ and the piston 27 for actuating ring 13‴ is supported on one of the brackets 14. It will be understood that by operating the handles 19, 20, 21, the pistons 22, 23, 24 will cause the pistons 25, 26, 27 to move and to rotate the cam rings 13′, 13″, 13‴ respectively as desired, and that said movements may be effected separately or simultaneously. Instead of flexible pipes, the connections with the collectors may be led through the trunnions 12′.

The battery is operated by two gunners sitting on seats 35, 36. One of them has within reach a telescope or sighting apparatus 37, a handwheel 38 for turning the carriage 31, a handwheel 39 for elevating the cradle 10 by tilting the annular support 12 on its trunnions 12′, and a pedal 40 for rotating the cradle 10 by means of a pinion 41 and toothed ring 42 through one of the trunnions 12′ of the support 12. The other operator controls the handles on board 18. By moving the handles 19, 20 over graduated scales provided on the board, he can control and adjust the initial angular offsetting of the barrel according to instructions received. By means of stops 43 movable at either side of handle 21 he then can adjust the angle through which said handle may be moved, said angle determining the maximum angle allowed for opening or spreading the bundle of barrels, so that he only has to rock the handle from one stop to the other to produce automatically, according to the initial angular offsetting of the barrels and the limited opening of the bundle, the desired distribution of bullets within the field covered by the battery, as soon as firing is started.

Of course the battery may comprise two or more coaxial bundles of barrels instead of one only, in which case the angular offsetting of the barrels may be effected either in all the bundles or only in one or in some of them, the controlling means being arranged to suit the purpose. The number and the relative arrangement of the barrels may of course be varied as required.

In the embodiments of the invention hereinbefore described, the various functions of the battery, i. e. pointing towards the future position of the target, opening and closing the bundle of barrels, rotating the bundle and firing, are controlled by means which require the use of both hands of at least one operator. It may be of advantage to enable these functions to be controlled with one hand only, so that the other hand is available for other duty, for example for operating the controls of an airplane or other vehicle carrying the battery. An arrangement whereby this is made possible will be described with reference to Figs. 19 to 21 which illustrate a battery or mounting comprising a bundle of four barrels 1 (three only of them being shown in Fig. 19) mounted on an axial stem 44 rigidly connected by a cross-shaped piece 45 with a cradle 46 having a spherical outer surface mounted in a spherical bearing in the frame 47.

At the end of the stem 44 is a handle 48 whereby the gunner can elevate or tilt the cradle with the whole battery in order to point same towards the target; by a twist of the wrist he furthermore can rotate the battery about its axis through say 90° on each side of its initial position. The cradle or its bearing may be provided with ball or roller bearings (not shown) in order to reduce the resistance to these movements.

Pivoted at 49 on the handle 48 is a finger piece 50 which can be depressed by the hand and brought to bear against the handle 48 against the tension of a spring 51. This movement of the finger piece 50 rocks a lever 52 which is engaged between two projections 53 on a sleeve 54 rotatably mounted on the stem 44. On being rotated the sleeve 54 carries with it a disc 55 provided with four helical slots 56 (Fig. 21) respectively engaged by four fingers 57. Each of said fingers 57 is rigid with a block 58 which carries one of the guns 1 and is adapted to rock on a pivot 59 supported in one of the arms of the cross piece 45. Thus, by depressing the finger piece 50, the plate 55 is rotated and the four barrels 1 are moved angularly, radially of the battery axis, to close the bundle, the reverse or opening motion being controlled by the spring 51.

While it is keyed to the stem 44 as regards rotation, the handle 48 is axially slidable relatively thereto to an extent sufficient to cause, when pushed inwardly by the operator, the actuation of a catch 60 which starts the firing by pulling the triggers 61 of the four guns by means of Bowden cables 62 or the like. Alternatively the gunner may control the catch 60 by means of a connection 63 and a finger catch 64 mounted on the handle 48. Recoil cushioning devices may be provided on the cradle or on the carriage in order to absorb vibrations.

The battery or mounting shown in Figs. 23 to 25, differs from the construction just described by the fact that the angular movements of the barrels 1 for opening or closing the bundle are directed tangentially as in the example of Fig. 9. The pivots 65 for the carrier blocks 58 here are arranged radially of the cradle. Instead of being engaged in helical slots, the fingers 57 engage in notches 66 (Figs. 22 and 25) in the rotatable sleeve 54 actuated by the finger piece 50 on handle 48. For the rest, the structure is the same as that described with reference to Figs. 19 to 21.

In some cases, as when the barrels are heavy, or numerous, it may be of advantage to use power or other means for rotating the battery and/or for opening and closing the bundle of barrels. We have illustrated in Figs. 26 to 30 two forms of controlling handles adapted for power actuation of the battery.

Referring to Fig. 26, the handle 48' is made hollow and encloses a flexible shaft 67 connecting the end of stem 44 with a worm gear 68 which is journalled in the handle and meshes with a worm 69 secured to the end of another flexible shaft 70. Shaft 70 is adapted to be rotated by a motor, or by a pedal or from any suitable source of power, not shown. It will be understood that the rotation of shaft 70 will cause the stem 44 and with it the cradle 46 and the barrels carried thereby to rotate about the battery axis at a slow speed owing to the interposition of the worm 69, the gunner only having to hold the handle 48' against rotation. This requires no effort, there being practically no reaction on the handle. The rotation may be continuous or intermittent as desired.

In the stem 44, here made of tubular shape, is slidably fitted a bar 71 of which the end near the handle 48 is connected, by a cross-piece 72 extending through longitudinal slots in the stem, with a grooved ring 73 which in turn is connected by links 74, with the finger piece 50' (Figs. 26 and 27). The cross-piece 72 is rotatably engaged in the circular groove of ring 73 so that it is adapted to rotate with stem 44, while the handle 48' and with it the ring 73 and links 74 are held stationary. The bar 71 is of square cross-section and its opposite end is provided on each of its four sides with rack teeth 75 (Fig. 29). Each of these four racks is in mesh with a toothed sector 76 which is pivoted for radial movement on the cradle stem at 77 and has, on the other side of the pivot, a slot 78 engaged by a pin 79 secured to the respective barrel 1. When the gunner, holding the handle 48, pulls with his fingers on the piece 50', the bar 71 is pulled by the links 74 and the sectors 76 are rocked by the racks 75. The slots 78 are so shaped that the movement of the sectors is accompanied by a movement of the barrels 1 about their pivots 59, whereby the barrels are moved inwardly and the bundle is closed. If the operator releases the finger piece 50', it is brought back to initial position by springs 80 and the sectors 76 cause the battery to open again. The use of the pin and slot connection ensures an accurate and smooth movement, which is important on acount of the vibrations due to firing and reduces the effort required from the operator in order to close the bundle.

In the modified form illustrated in Figs. 28 and 29, the sliding bar 71 is controlled mechanically in order still further to relieve the operator. To that end the finger piece 50' is replaced by a horizontal yoke 81 to which a reciprocating motion is imparted by means of an eccentric or cam 82 rotated from the power shaft 70 through worm 69, gear 68, gears 85 and 84 and shaft 83. The reciprocating motion is transmitted by the links 74 to the bar 71 and it causes the battery to open and close in succession. If desired, a clutch may be interposed in the transmission to enable the gunner to start or stop the opening and closing movement of the guns, which movement takes place simultaneously with the rotation of the cradle which is also controlled from the power shaft 70.

Firing is controlled by the operator pushing with his thumb on a catch 86 mounted on one side of the top portion of the handle 48'. Through a rock lever 87, links 88, a grooved ring 89 and a cross-piece 90 extending through slots in the hollow stem 44, the catch 86 controls Bowden cables 91 connected each to the trigger 92 of one of the barrels 1. The cross-piece 90 is rotatably engaged in the circular groove of ring 89 so that when the stem 44 is rotated said cross-piece will rotate with it, while the handle 48', lever 87 and links 88 do not partake in the rotation. Thus all the machine guns 1 are simultaneously put into action and the firing control is independent of the rotational opening and closing movements of the bundle of barrels, owing to the coaxial arrangement of the barrels 1, of the flexible shaft 67 and of the links 74 and 88.

Instead of being arranged circumferentially about the battery axis, the barrels may be arranged otherwise, for example in rows. We have illustrated in Figs. 31 to 34 a battery or mounting of twelve barrels 1 grouped on a rectangular cradle 93 in three parallel rows of four barrels each. The cradle 93 is rotatable on a circular runway 94 to train the battery. The barrels 1 are each mounted in a ball support 95 and fingers 96 on their lower ends are guided in blocks 97 which are connected in sets, transversely of the battery, by cross-rods 107. The blocks 97 of one of the rows, for example the central row, are shaped as nuts which are threaded on screw-threaded portions 99 of a rotatable spindle 98.

The spindle 98 is engaged at 100 by a controlling lever 101 pivoted on a shaft 102. At its other end the spindle 98 is connected to a lever 103, which in turn is connected to the lever 101 by a rod 104, the whole forming a hinged parallelogram. By means of a handwheel 105, the spindle 98 may be rotated, thereby causing the blocks 97 to move axially and varying the angular position of the barrels 1. The screws 99 on spindle 98 may have different pitches, or some of them may have opposite threads, in order to enable the divergence of the barrels being varied. The axes of the levers 101 and 103 are journalled at 114 in blocks 20 pivotally mounted on the cradle 93 so that the barrels 1 may be rocked to either side by imparting to the handle 109 of lever 101 a sidewise movement.

If this arrangement is used for controlling the central row as shown, we may impart the same movements to the side rows by connecting together the lower ends of the barrels of each row by means of longitudinal rods 106, while their blocks 97 are connected with the blocks 97 of the central row by the cross rods 107.

Then, by operating the lever 101 or its handle 109, we can rock the barrels to and fro, and from side to side according to the direction we wish to give to the battery axis. By acting on the handwheel 105, we can vary the divergence of the barrels with respect to this axis in the longitudinal direction. Handwheels 108 may also be provided on turnbuckles 111 interposed in the cross rods 107 in order to vary the length of such rods and vary the barrel divergence in the transverse direction. As shown in Fig. 3, the handwheels 108 need be provided only on one of the cross rods 107 as the movement may easily be transmitted to similar turnbuckles 111 in the other cross rods by means of chains 112 and pinions 113.

It will be understood that the constructional details herein described with reference to the drawings may be varied according to requirements without departing from the scope of our invention as defined by the following claims.

We claim:

1. In a gun battery, the combination of a support, a cradle adapted to be trained on said support, a plurality of gun barrels arranged in a bundle on said cradle, means for rotating said barrels about the axis of said bundle, means for moving said barrels angularly with respect to said axis to open and close said bundle, both said means being operable separately and simultaneously, said barrels being each pivoted on said cradle for angular movement tangentially with respect to said axis, means operable independently of both said means for angularly offsetting some of said barrels with respect to others of said barrels, and means operable during the rotation of said barrels to control said offsetting means.

2. In a battery of gun barrels, the combination of a cradle, means for training said cradle, a bundle of gun barrels pivotally mounted on said cradle, means for rotating said barrels about the axis of said bundle, means for pivoting said barrels tangentially with respect to said axis, means controlling the angular motion of said barrels, said controlling means comprising parts mounted for simultaneous action to control the opening and closing of said bundle, parts mounted for individual actuation to produce relative angular offsetting of said barrels, means for operating at will any of said parts, distant controls for operating said controlling means, said distant controls comprising pipes filled with an incompressible fluid and rotating collectors arranged axially of said bundle of barrels and distant controls for operating said rotating means.

FERNAND RADELET.
MAX SCHUL.